United States Patent [19]

Hein

[11] 4,340,000
[45] Jul. 20, 1982

[54] FLUIDIZED BED FURNACE

[75] Inventor: Helmut Hein, Mulheim-Ruhr, Fed. Rep. of Germany

[73] Assignee: Steag AG, Essen, Fed. Rep. of Germany

[21] Appl. No.: 25,365

[22] Filed: Mar. 30, 1979

[30] Foreign Application Priority Data

Apr. 3, 1978 [DE] Fed. Rep. of Germany ....... 2814239

[51] Int. Cl.³ .................. F27B 15/00; F23D 1/00; F23G 7/00; F23C 11/02
[52] U.S. Cl. ..................................... 110/245; 431/7; 431/170
[58] Field of Search ............... 110/245, 346, 347, 263; 431/7, 170; 122/4 D

[56] References Cited

U.S. PATENT DOCUMENTS

| | | | |
|---|---|---|---|
| 3,737,283 | 6/1973 | Nikles | 431/170 X |
| 3,914,089 | 10/1975 | Desty et al. | 431/7 |
| 3,915,657 | 10/1975 | Staffin et al. | 110/245 X |
| 3,994,244 | 11/1976 | Pledger et al. | 110/245 |
| 4,171,945 | 10/1979 | Lazenby | 431/170 |
| 4,176,623 | 12/1979 | Blaskowski | 110/263 X |
| 4,177,742 | 12/1979 | Uemura et al. | 110/346 |

FOREIGN PATENT DOCUMENTS 1137628 12/1968 United Kingdom .
1368352 9/1974 United Kingdom .

Primary Examiner—John Petrakes
Attorney, Agent, or Firm—Andrus, Sceales, Starke & Sawall

[57] ABSTRACT

A fluidized bed furnace having a vessel with cooled or insulated walls and an inflow plate. A fluidized bed of inert material is maintained by air nozzles in the inflow plate and heated to the ignition temperature of coal. Pressure pipes deliver the coal and, if appropriate, additives such as lime, into the vessel below the upper boundary of the fluidized bed for combustion.

3 Claims, 3 Drawing Figures

U.S. Patent
Jul. 20, 1982
4,340,000
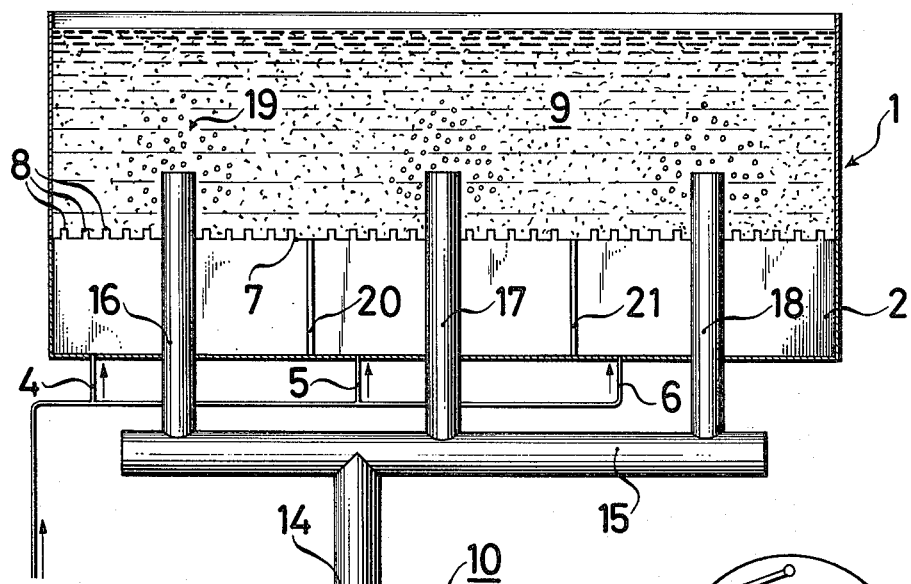
FIG. 1
FIG. 3
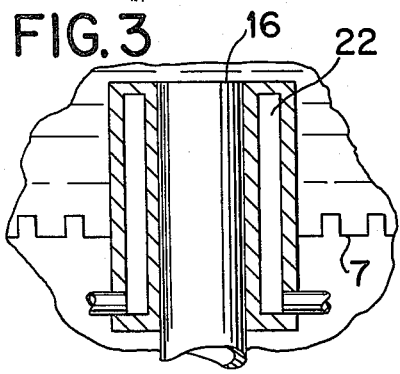
FIG. 2

FLUIDIZED BED FURNACE

BACKGROUND OF THE INVENTION

1. Field of the Invention

The invention relates to a fluidised bed furnace, in which, in a vessel having cooled or insulated walls and an inflow plate, a fluidised bed consisting of a comparatively inert material is maintained by air fed by means of air nozzles in the inflow plate, the fuel being fed to the fluidised bed after the latter has been heated up to the ignition temperature of the fuel.

2. Description of the Prior Art

Fluidised bed furnaces are used in particular for the combustion of lumpy coal, coal dust or coal slime, corresponding wastes or the like. On the one hand, the combustion air fed in via nozzles in the inflow plate leads to a uniform distribution of the air and, on the other hand, this air also effects a continuous upward and downward tubulence of the mass of the bed so that, in particular in the vertical direction, intense and thorough mixing of fuel, air and the inert material serving as the heat carrier can take place.

It is known to the state of the art to feed the fuel from above via one or more gravity shafts into the fluidised bed. This type of feed is very robust and simple, but it is no longer satisfactorily feasible in the case of relatively large fluidised beds. There should always be one feed point for each 1 to 3 m² of fluidising plate in order to be able to charge the bed area uniformly. Although the fluidised bed, due to its character, automatically distributes the feed material, this property is restricted by inserts, such as submerged heating surfaces or the like. In any case, for a bed area of more than 3 m², the capacity of the fluidised bed to achieve a uniform distribution is insufficient.

A pneumatic feed of the fuel via pneumatic feed devices which are provided uniformly across the inflow plate is also known to the state of the art. Pneumatic feeding, however, requires comminution and drying of the feed material since a moisture content of more than 6 to 8% in the feed material leads to sticking in the lines. Moreover, a mixture made up beforehand can comparatively readily separate again due to the different density of its constituents.

In principle, it should be stated with respect to mechanical feeding that its possible applications are restricted and, in particular, it is not possible satisfactorily to charge an inflow plate area beyond about 30 to 40 m². An increase in the bed area would seriously impair the functioning of the fluidised bed process or would make it completely impossible.

Furthermore, in the case of pneumatic feeding, a comparatively large proportion of dust is obtained during the required comminution of the feed material, which dust proportion does not participate either in the distribution of the material in the fluidised bed or in the combustion process taking place there. This proportion is later recovered in the dust collector. Recycle is not possible since the particles cannot be held in the fluidised layer. It is therefore necessary to make provision for appropriate storage or disposal of this proportion, and this makes the corresponding type of firing substantially more expensive.

SUMMARY OF THE PRESENT INVENTION

It is the object of the invention to provide a fluidised bed furnace with simple means, wherein the combustion material or feed material, without preparation as far as possible, can be introduced via comparatively large inflow plate areas in such a way that the formation of dust and bubbles on introduction is avoided.

According to the invention, this object is achieved when pressure pipes, which communicate with a forced feed provided outside the vessel and delivering the feed material, that is to say the fuel and, if appropriate, additives, lead into the vessel below the upper boundary of the fluidised bed.

This measure makes it possible to introduce the feed material largely without preparation and mechanically into the fluidised layer and to obtain comparatively large inflow plate areas by an appropriate distribution of the pressure pipes, and in this case the feed material is not only well distributed but the disadvantages connected with the prior mechanical and pneumatic feeding are also eliminated.

In the fluidised bed furnace according to the invention, it proves to be a particular advantage that lime of a comparatively coarse grain of more than 12 mm can also be introduced. As a result of the heat shock, the coarse grain here gradually disintegrates to give fine grain having a pure and fully active surface. Moreover, this material remains for a comparatively long period in the fluidised layer and the reaction times are thus extended.

The combustion of any coal which may have been introduced also proves to be substantially more favourable in a fluidised bed furnace according to the invention. The comparatively large lumps of coal remain in the fluidised layer for a longer time, that is to say up to ¾ hour, and no bubbles at all are formed in the fluidised layer by the carrier air for the coal. In this way, a blow-out of fine grain from the fluidised layer by the carrier air is also avoided.

Preferably, the pressure pipes can be connected in groups to the forced feed which is, for example, designed as a solids pump. In another possible procedure, each pressure pipe is supplied by one solids pump.

The pressure pipes can also be combined in groups which are distributed over the inflow plate cross-section and which are each supplied by one solids pump effecting the forced feed.

Preferably, the pressure pipes lead through the inflow plate into the vessel, it being advantageous to ensure that the spacings and the distribution of the pressure pipes are selected in such a way that each pressure pipe charges about 1 to 3 m² with feed material.

Of course, it is also possible in a further development of the invention to ensure that the pressure pipes are cooled by suitable means.

As an illustrative embodiment, the combustion of coal with a sulphur binder, for example limestone, in a fluidised bed furnace is to be explained in more detail.

To save a flue gas scrubber downstream of a coal furnace, a fluidised bed furnace is used in which a coal/limestone mixture is charged to the fluidised bed. The sulphur liberated during the combustion of the coal is bonded to the lime, which is burned in the fluidised layer, to give gypsum which does not pollute the environment.

The coal used for the combustion can be of any desired quality and can be delivered as fine slack, middlings or nut coal. The limestone delivered is preferably coarse-grained. The moisture content of the materials delivered is of no particular significance.

The solids pump used can be a concrete pump, a screw or another mechanical pressure-raising device. In the illustrative embodiment explained, the pressure pipes are inserted from below through the air box of the inflow plate into the fluidised layer. It is, however, also possible to insert the pressure pipes from the side or from above into the fluidised layer. At least in the zone where they end in the fluidised layer, the pressure pipes can be protected by a coolant against the high temperatures prevailing there.

The depth of penetration of the pressure pipes into the fluidised layer depends essentially on the grain and the quality of the fuel used and can be determined by trials.

The comparatively coarse-grained feel material emerging from the particular pressure pipe into the fluidised layer is distributed and comminuted over a zone of a maximum of about 3 m² as the result of the property of the fluidised bed. This also applies to coal which is still caked and to the limestone. The fluidised layer is formed in the inert material, for example sand, ash or limestone, which is converted into a floating bed by the combustion air entering through the inflow plate. This floating bed is brought to the ignition temperature of the fuel by means of a burner, before the coal and limestone are introduced.

If the furnace is to be operated only at part load, certain pressure pipes or groups of pressure pipes can be isolated, it being necessary, however, to ensure that the isolated pressure pipes are emptied of feed material and the pressure pipes are filled with an inert material. Part load operation can be carried out with the aid of an automatic system, it being necessary to ensure that, for the same part load, different part beds are isolated in each case so that the overall bed temperature corresponding to the part load is kept constant. It is also necessary to ensure that, with part load, no part bed can be cooled down excessively, so that ignition of the fuel is ensured when returning to full load.

It has been found that these process steps are entirely feasible even with caking and swelling coal. The feed rate of the fuel into the pressure pipes is to be adjusted in such a way that the discharge of the fuel into the fluidised bed always takes place a little faster than possible blocking of the pressure pipes as the result of caking of the feed material. It is also advantageous to keep the piece of pressure pipe protruding into the fluidised bed as short as possible or to apply a comparatively intense cooling.

The term "formed feed" used above is to be understood, amongst the solids pumps mentioned by way of example, also as screws having a variable pitch and, quite generally, any type of displacement pumps, provided they are suitable for the envisaged purpose.

BRIEF DESCRIPTION OF THE DRAWING

In the drawing

FIG. 1 shows a section through a fluidised bed vessel with the fuel being fed in accordance with the invention and FIG. 2 shows a sub-division of a bed as an illustrative example.

FIG. 3 shows a fragmentary view of a cooling means for the pressure pipes.

DETAILED DESCRIPTION OF THE PREFERRED ENBODIMENT

In FIG. 1, 1 marks a vessel, below which an air box 2 is located which is supplied with combustion air via the line 3 and the branch lines 4, 5 and 6. This air flows out into the vessel 1 from the air nozzles 8 provided in the inflow plate 7 and maintains there the fluidised bed of inert material, generally marked 9. The fuel is fed with the aid of the solids pump, generally indicated at 10, for example a pump having a piston 11 and a drive pulley 12, the fuel being introduced into the pump via the line 13 in the direction of the arrow. The fuel leaves the pump 10 via the line 14 from which it passes into the distributor line 15. From the distributor line 15, the fuel enters pressure pipes 16, 17 and 18 which end above the inflow plate in the fluidised bed 9. The material emerging from their upper end is diagrammatically indicated, for example at 19. 20 and 21 mark partition walls, two of which are also indicated in FIG. 2 with the same reference numerals. In that Figure, a grouping of, for example, a total of eighteen part zones can be seen, which are mutually combined in groups, as indicated by the Roman numerals, and which, if desired, are in each case supplied by a solids pump. However, they can also each be supplied by one solids pump, the operation of which is then combined corresponding to the grouping indicated by Roman numerals.

Pressure pipes 16, 17 and 18 may be cooled by a coolant circulated in passages 22 in the pipes, as shown in FIG. 3.

I claim:

1. A fluidized bed furnace for coarse grained coal feed material comprising:
    a vessel having heat resistant walls and an inflow plate extending between said walls to form a plenum extending entirely across the bottom of the vessel, said plenum and inflow plate being formed into a plurality of rows of adjacent rectilinear zones;
    air nozzles in said inflow plate for providing an air feed to maintain a fluidized bed of comparatively inert material in said vessel above said plate;
    a plurality of coal supply pipes extending through said inflow plate into said vessel beneath said fluidized bed and above said inflow plate, one of said coal supply pipes being located in each of said zones, said coal supply pipes being connected into zone groups so located on the inflow plate as to permit part load operation of the furnace while maintaining fluidized bed temperatures, said pipes terminating in the fluidized bed below its upper boundary, said pipes being sized to supply coarse grained coal to the fluidized bed; and
    fuel supply means selectively communicating with said groups of coal supply pipes for forcing said coal through said pipes.

2. The fluidised bed furnace according to claim 1 wherein said coal supply pipes are so spacedly located in said vessel that each pipe supplies fuel to an area corresponding to from 1 to 3 square meters of said inflow plate.

3. The fluidised bed furnace according to claim 1 wherein said coal supply pipes contain cooling means.

* * * * *